US008549483B1

(12) United States Patent
Bridges, Sr. et al.

(10) Patent No.: US 8,549,483 B1
(45) Date of Patent: Oct. 1, 2013

(54) ENGINE FOR SCALABLE SOFTWARE TESTING

(75) Inventors: Michael S. Bridges, Sr., Oceanside, CA (US); Dennis Keith Fischer, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1133 days.

(21) Appl. No.: 12/357,609

(22) Filed: Jan. 22, 2009

(51) Int. Cl.
*G06F 9/44* (2006.01)
(52) U.S. Cl.
USPC .......................................................... 717/126
(58) Field of Classification Search
None
See application file for complete search history.

(56) References Cited

U.S. PATENT DOCUMENTS

| | | | | |
|---|---|---|---|---|
| 5,475,843 | A * | 12/1995 | Halviatti et al. | 717/124 |
| 5,781,720 | A * | 7/1998 | Parker et al. | 714/38.11 |
| 5,790,117 | A * | 8/1998 | Halviatti et al. | 715/744 |
| 6,121,901 | A | 9/2000 | Welch et al. | |
| 6,243,835 | B1 | 6/2001 | Enokido et al. | |
| 7,519,921 | B2 | 4/2009 | Raghavan et al. | 715/814 |
| 7,743,090 | B1 * | 6/2010 | Gibson et al. | 709/202 |
| 8,151,276 | B2 * | 4/2012 | Grechanik et al. | 719/316 |
| 8,185,877 | B1 * | 5/2012 | Colcord | 717/127 |
| 8,225,140 | B2 * | 7/2012 | Couldwell et al. | 714/38.1 |
| 2003/0005413 | A1* | 1/2003 | Beer et al. | 717/125 |
| 2003/0056150 | A1* | 3/2003 | Dubovsky | 714/38 |
| 2004/0003325 | A1 | 1/2004 | Muller et al. | |
| 2004/0044993 | A1 | 3/2004 | Muller et al. | |
| 2005/0021289 | A1* | 1/2005 | Robertson et al. | 702/182 |
| 2005/0137967 | A1 | 6/2005 | Ryan | |
| 2005/0166094 | A1* | 7/2005 | Blackwell et al. | 714/38 |
| 2005/0204298 | A1* | 9/2005 | Kemp | 715/762 |
| 2006/0218028 | A1 | 9/2006 | Kelly et al. | |
| 2006/0253798 | A1* | 11/2006 | Raghavan et al. | 715/804 |
| 2008/0127095 | A1* | 5/2008 | Brennan et al. | 717/124 |
| 2008/0127101 | A1 | 5/2008 | Anafi et al. | |
| 2008/0155515 | A1* | 6/2008 | Stewart | 717/135 |
| 2008/0235633 | A1* | 9/2008 | Ghiloni et al. | 715/862 |
| 2008/0244524 | A1* | 10/2008 | Kelso | 717/124 |
| 2008/0270998 | A1* | 10/2008 | Zambrana | 717/131 |
| 2008/0276260 | A1* | 11/2008 | Garlick et al. | 719/328 |
| 2008/0295076 | A1* | 11/2008 | McKain et al. | 717/124 |
| 2009/0037883 | A1* | 2/2009 | Garbers et al. | 717/125 |
| 2009/0070121 | A1 | 3/2009 | Leonelli et al. | |
| 2009/0217303 | A1* | 8/2009 | Grechanik et al. | 719/320 |
| 2009/0288070 | A1* | 11/2009 | Cohen et al. | 717/125 |
| 2009/0320002 | A1* | 12/2009 | Peri-Glass et al. | 717/131 |
| 2010/0217694 | A1 | 8/2010 | Knighton | |

FOREIGN PATENT DOCUMENTS

EP 1024657 B1 5/2002

* cited by examiner

*Primary Examiner* — Wei Zhen
*Assistant Examiner* — Adam R Banes
(74) *Attorney, Agent, or Firm* — Park, Vaughan, Fleming & Dowler, LLP; Steven E. Stupp

(57) ABSTRACT

Embodiments of a system (such as a computer system), a method, and a computer-program product (e.g., software) for use with the computer system are described. These embodiments may be used to test software that includes instructions for a graphical user interface with objects that receive values in associated fields. In particular, during testing, the system identifies the objects and associated expected values in the software, tests the software based on the identified objects and the expected values, and generates a flow file which includes the testing operations and corresponding results. Moreover, during the testing, the system may generate a compliance document which includes the testing operations and the results. Additionally, the system compares differences between the flow file and a previous flow file (associated with previous testing), and presents differences to a quality-assurance analyst who evaluates whether or not the differences are consistent with design changes between the software and a previous version of the software.

21 Claims, 7 Drawing Sheets

ENGINE FOR SCALABLE SOFTWARE TESTING

BACKGROUND

The present invention relates to techniques for testing software.

In order to improve the ease of use, and thus, customer satisfaction, many software products include graphical user interfaces (GUIs). Unfortunately, it is often difficult to test software products that include GUIs. In particular, in order to test a GUI using existing testing software, the objects in the GUI, as well as the associated fields and formats for receiving and outputting data, are typically predefined. This means that responses to an ordered group of operations performed by testing software are typically predictable. For example, the objects, fields, formats and associated testing operations may be specified using test (or procedural) scripts and object maps, which are provided prior to testing.

However, it is difficult to maintain such test scripts and object maps. This is especially true in the development process, during which there is a cyclical interaction between testing and development groups. For each version of the software, any changes to the software need to be tracked, and the test scripts and object maps need to be modified prior to any subsequent testing. The time required for this tracking and modification of the test scripts and object maps often limits the amount of testing that can be performed, which prevents software testers from systematically identifying and correcting errors in their software products. Moreover, this can adversely affect software development costs, product reliability and, ultimately, customer satisfaction.

Similar issues occur when documenting test procedures and test results. In particular, many existing techniques require test operators to maintain a log of the test procedures and test results. Unfortunately, the need to expend time to maintain such documentation often limits the amount of testing that can be performed.

SUMMARY

One embodiment of the present invention provides a system (such as a computer system) that tests software. During operation, the system accesses a previous flow file which includes previous testing operations and corresponding results obtained during previous testing of a version of the software, which can include a current version of the software, and which includes instructions for a graphical user interface with objects that are configured to receive values in associated fields. Then, the system identifies the objects and associated expected values in the current version of the software (for example, with support of a runtime data bridge and persistent field naming convention). Next, the system performs current testing of the current version of the software based on the identified objects and the expected values. During this process, the system generates a current flow file which includes current testing operations and corresponding current results obtained during the current testing. Additionally, the system compares differences between the previous flow file and the current flow file, and evaluates whether or not they are different in order to display differences to a test operator to assess whether they are consistent with design changes between the current version of the software and a previous version of the software. If the difference is not as designed, then it is identified as a defect.

Note that the current testing may be performed without using a predetermined sequential list of test commands (such as scripting language instructions).

In some embodiments, the system performs the previous testing of the current version of the software, and stores the previous flow file. For example, the previous testing may be performed by a test operator based on a predetermined test case.

Moreover, in some embodiments, the system also receives the current version of the software.

In some embodiments, identifying the objects and the expected values involves analyzing the screen-by-screen transmission of object identifiers from the current version of the software (which is referred to as the bridge data) to determine the expected values for associated fields. Additionally, performing the current testing may involve retrieving stored values in the previous flow file and inserting the stored values into the associated fields. Note that the ordering of the current testing operations may be different than the ordering of the previous testing operations.

Furthermore, performing current testing of the current version of the software may involve assigning test cases (in the form of flow files) to test agents executing on different computers. Note that these test agents may operate independently of each other. For example, at least some of the test cases may be performed in parallel on the computers. Consequently, the system may facilitate testing of the current version of the software which is limited by a number of available computers instead of a number of test operators performing the testing.

In some embodiments, comparing the differences between the previous flow file and the current flow file involve graphically presenting the differences. Furthermore, the evaluating operation may involve receiving an evaluation from a test operator. Note that the comparing and the evaluating operations may be performed during the current testing.

In some embodiments, the current flow file is generated without input from a test operator.

Additionally, in some embodiments, the system defines the current flow file as the previous flow file to facilitate additional testing of the current version of the software and/or a subsequent version of the software.

Another embodiment provides a method including at least some of the above-described operations.

Another embodiment provides the computer system.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

Figure 1:
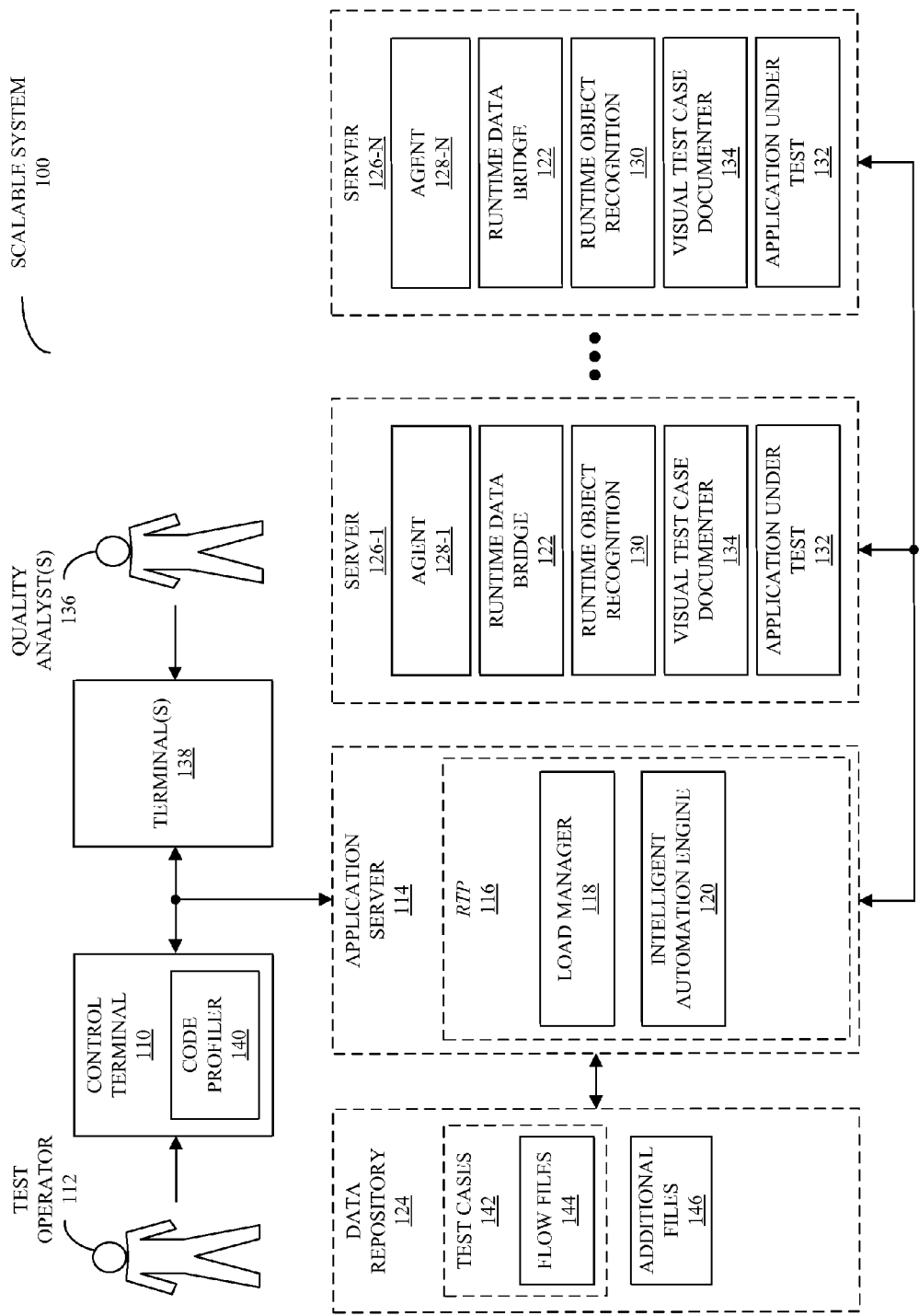
FIG. 1 is a block diagram illustrating a scalable system which tests software in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system (such as a computer system), a method, and a computer-program product (e.g., software) for use with the computer system are described. These embodiments may be used to test software that includes instructions for a GUI with objects that receive values in associated fields. In particular, during testing, the system identifies the objects and associated expected values in the software, tests the software based on the identified objects and the expected values, and generates a flow file which includes the testing operations and corresponding results. Moreover, during the testing, the system may generate a compliance document which includes the current testing operations and the current results. Additionally, the system compares differences between the flow file and a previous flow file (associated with previous testing), and presents the differences to a quality-assurance analyst who evaluates whether or not the differences are consistent with design changes between the software and a previous version of the software.

This testing technique can remove operator-induced limitations on the amount of testing. For example, by eliminating the need for operators to manually maintain test scripts and expected test data, the number of test cases that can be executed is only limited by the hardware (i.e., the number of available computers or servers). Moreover, the testing software may reliably execute test cases even with software that is changing (i.e., during a dynamic development process). These attributes of the testing technique allow comprehensive testing of the software responses via the GUIs in the software (as opposed to verification of a selected subset of predefined responses). Hence, the testing technique may lead to: shorter development time, reduced development costs, improved software reliability and, ultimately, enhanced customer satisfaction and retention.

We now describe embodiments of a scalable system to test software. Regression testing is a type of software testing that attempts to identify software bugs or errors that make a software feature stop functioning as intended after a certain event, such as after a revision of the software during the software development process. Typically, software tests are developed to regression test stable software using test scripts (e.g., scripting programming-language instructions) that have predictable responses, and which test the software from the top down. Moreover, the predictable responses are usually specified by test cases, which include a set of conditions or variables that are used during the software testing to determine if a requirement or use case for the software is partially or fully satisfied.

Unfortunately, by the time the test scripts for a version of the software are developed, a new version of the software may have been generated. (Note that large scale testing of software can, at times, rival the complexity of the software being tested.) This lack of code stability during the software development process often limits the amount of software testing that can be performed, because test scripts and test cases written by the test analysts for one version of the software are often obsolete for the next version.

In order to facilitate software testing on a large scale, there is a need to test dynamic code (i.e., software that is changing as a function of time). In the discussion that follows, this problem is addressed in a scalable system by separating the test code from the associated test data, and eliminating the need to maintain (or update) the test cases, thereby significantly reducing or eliminating the constraints in software testing (in particular, the constraints associated with the finite number of human test operators). This scalable system enables testing of software in which there are multiple GUIs that are frequently changed during the software development process.

In such a scalable system, a testing application (which is henceforth referred to as a 'regression test platform' or RTP) running on an application server controls multiple agents running multiple test cases in multiple server operating-system sessions in which the instances of the software application are being tested (which is henceforth referred to as the 'application under test'). RTP is an engine that provides a data-driven framework in which: test cases are documented automatically, the testing software responds with the correct data entries when the application under test prompts for data (by communicating field identifiers to an agent through a runtime data bridge) during a given session (which ensures correct execution of a given test case), the test cases are automatically maintained, and the test conditions and results are automatically documented. RTP includes: a runtime data bridge, runtime object recognition, a visual test case documenter, and an intelligent automation engine.

Note that the runtime data bridge is a programming technique (which may be included in the application under test or may be a stand-alone application) that defines the data entries for RTP using a consistent, persistent naming approach. In an exemplary embodiment, the consistent, persistent naming approach is received by the runtime data bridge from the application under test. This consistent, persistent naming approach may include the identifiers for the form sets (which are component-based representations of GUIs) and field names of the GUIs in the application under test.

Moreover, the runtime object recognition may provide object recognition capability to simplify test-code automation. This object-recognition capability may be used to identify buttons, fields and other objects in the GUIs in the application under test, which allows repeatable test cases to be documented and reliably re-executed.

Additionally, the visual test case documenter may monitor events in the application under test in order to comprehensively document the software testing (such as the data entries and navigation within the application under test). In particular, the visual test case documenter may execute in the background during the software testing and may record all activity associated with the application under test. During this process, several output files may be generated, including: a movie file for each of the test cases, a written procedure for each of the test cases, versioning information pertaining to the test cases, and/or the outputs from the application under test for each of the test cases. This documentation may enable automatic re-execution of the software testing, verification of the test results, and, thus, accelerated problem diagnosis. Furthermore, because the visual test case documenter can monitor the automatic re-execution, the test cases can be updated on the fly. This capability may eliminate the need for maintenance of the test code and the test data by the test operators, which facilitates scaling of the software testing to a very large number of test cases.

The intelligent automation engine may interface with agents which interface with the runtime data bridge to feed test data into the application under test in an arbitrary prompting order, which is provided by the application under test during the given session. This facilitates end-to-end testing through the GUIs in the application under test. In particular, at runtime, the application under test may tell the intelligent automation engine the exact data entries to enter for each GUI using the consistent, persistent naming approach provided by the runtime data bridge.

These features in the RTP may eliminate or drastically reduce the workload of the one or more test operators and test analysts in the scalable system, which have previously been required to create test scripts, run the test scripts and evaluate the test results. Consequently, the scalable system and RTP facilitate comprehensive software testing involving thousands of test cases, which allows software testing that can achieve and sustain near zero defects.

FIG. 1 presents a block diagram illustrating a scalable system 100 to test software. In this system, a test operator 112 at a control terminal 110 selects some or all of test cases 142 and defines jobs. In response to instructions from the test operator 112, RTP 116, which executes on application server 114, reads the selected test cases from data repository 124 (including the stored flow files 144 for the test cases). Load manager 118 then assigns these test cases to agents 128, which execute sessions of software that tests application under test 132 on servers 126. In some embodiments, there are multiple agents 128 per server (for example, there may be two hundred agents per server running in server operating-system sessions).

Note that the sessions may be executed independently of each other. For example, at least some of the sessions may occur in parallel. Consequently, load manager 118 may perform load leveling of the servers 126. In an exemplary embodiment, servers 126 include virtualized server-class machines, and load manager 118 performs various operations including: determining queuing, determining prioritization, determining reservations, recognizing pre-existing configurations, monitoring activity, and/or monitoring capacity utilization. Moreover, agents 128 may be implemented using the .NET Framework™ (from Microsoft Corporation, of Redmond, Wash.).

As sessions are completed, RTP 116 may perform verification and may store test results, such as flow files 144 and additional files 146 generated by visual test case documenter 134 (which may execute on application server 114 and/or on servers 126), to the data repository 124. In addition, a control GUI (such as a test console) displayed on control terminal 110 may be updated to provide the test operator 112 with test status and result information. This allows the test operator 112 to evaluate results as they are generated, and if needed, to revise the selected test cases accordingly. In an exemplary embodiment, RTP 116 is implemented using Microsoft Visual Studio™ (from Microsoft Corporation, of Redmond, Wash.).

While the given session is executing, application under test 132 and an intelligent automation engine 120 may collaborate through runtime data bridge 122, which passes form set and field names to intelligent automation engine 120. For example, when a given GUI is rendered, runtime data bridge 122 may open a socket and stream a description of the controls for that GUI to intelligent automation engine 120. This stream may include all of the GUI controls that will be rendered. Moreover, this information may allow intelligent automation engine 120 to access specific data entries (such as specific values in a baseline flow file) that are fetched and re-entered (or inserted) into the GUI, and may eliminate potential execution failures because of an inability to recognize any new or changed GUI objects. Consequently, intelligent automation engine 120 may be able to respond intelligently to the data prompts from application under test 132, even when there is a potentially different flow of GUIs and data prompts than in previous software testing.

In this product-driven approach, the execution order is discovered on the fly, rather than in a predictable top-down sequence, thereby eliminating the need for test scripts (e.g., scripting programming-language instructions) or 'action word sequences' during the software testing.

Moreover, by using runtime object recognition 130, agents 128 may also eliminate the need for GUI mapping. Instead, the window handles, and form sets and field identifiers in a given GUI may be provided to intelligent automation engine 120, which responds with the appropriate data entries, thereby allowing the agents 128 to interact with objects in the GUIs, and thus, to query all states in the application under test 132. For example, application under test 132 may have 14,500 GUIs, and a given agent may be able to interact with, for example, 1000 objects in a given GUI in 200-300 ms. In conjunction with the other features of RTP 116, this capability may enable exhaustive testing which is limited only by the amount of available hardware (such as the number of servers 126). In an exemplary embodiment, runtime object recognition 130 uses a class library and Microsoft Windows Active Accessibility™ (from Microsoft Corporation, of Redmond, Wash.), which is included in Windows operating systems, such as Windows Vista™ (from Microsoft Corporation, of Redmond, Wash.).

During a given session, the given agent performs software testing of application under test 132 based on a given test case. This software testing includes running one or more flow files associated with the assigned test cases, and performing comparisons with expected results (which are defined by a baseline, such as a baseline flow file). Note that a given flow file describes a traversal through one or more GUIs, and may include data and instructions. In an exemplary embodiment, the given flow file is an Extensible Markup Language (XML) file documenting the data necessary to execute the given test case and to evaluate its results. As described further below, the given flow file is created or updated by visual test case documenter 134 while the given test case is performed by either RTP 116 or manually by test operator 112. In an exemplary embodiment, the given flow file is organized into sections according to the GUI name based on the sequence in which the GUI was accessed. Moreover, in each section, the control objects and their properties within the corresponding GUI are saved when the given agent or the test operator leaves this GUI. Furthermore, the given flow file includes the given agent or the test operator's keyboard entries and/or mouse clicks, which are detected by visual test case documenter 134 and written to the flow file as each data entry is made.

This testing technique represents a paradigm shift from conventional test scripts that 'push' data into application under test 132. Using runtime data bridge 122 and runtime object recognition 130, RTP 116 allows application under test 132 in the given session to 'pull' data from the given flow file in an arbitrary order. This is significant because the test script/push convention is typically inflexible. For example, when a designer relocates a field to a different GUI to improve the customer experience, the test script is no longer synchronized with the software. Consequently, software testing using conventional test scripts will fail unless the test scripts are reengineered. In contrast, the pull approach of RTP 116 mimics the prompts and responses that occurs when users interact with the software application, without assuming or predefining the data-prompting sequence.

As noted previously, in order to eliminate the scalability constraints imposed by test-operator maintenance of the test code and the test cases 142, visual test case documenter 134 performs these operations, on the fly, while the selected test cases are executed. In particular, visual test case documenter 134 executes in the background and records operations performed on application under test 132 (including keystrokes and mouse-clicks) and records the corresponding test results without input from test operator 112. For example, visual test case documenter 134 may record or capture events being sent by the application under test 132 to the operating system at runtime as the given agent operates the application under test 132. As described further below, this flow-file information, which is stored in real time by the visual test case documenter 134, can be used to update the test cases 142 based on changes to the software application. Note that the storage of the operations and the identifiers (for the fields) associated with the data entries in the given flow file allows RTP 116 to automatically repeat the identical operations and data entries on a subsequent version of the application under test 132 in order to verify the response of the application under test 132 (i.e., to reproduce the test results).

In addition to one or more flow files 144, visual test case documenter 134 may output additional files 146 for use by humans, such as test operator 112 or quality analyst(s) 136, including: a word-processor compatible file with step-by-step operations for manual reproduction of the given test case, an audio-visual file (such as a file compatible with an audio-visual-interleave format) with video of an enacted test case, and/or an output file with output values exported by the fields in the objects in the GUIs in the application under test 132. These additional files may be stored in data repository 124.

Note that the word-processor compatible file may fulfill compliance requirements for a regulation associated with the testing of the current version of the software application. For example, the regulation may include the Sarbanes-Oxley Act. Moreover, the audio-visual file can provide recorded evidence (including time stamps) of any differences between a baseline (such as a baseline flow file associated with a previous version of the software and/or previous software testing) and a current flow file for subsequent evaluation by quality analyst(s) 136. In some embodiments, the software or application under test 132 includes TurboTax™ (from Intuit, Inc., of Mountain View, Calif.), and the output file includes a rendering of an income-tax return, for example, in Adobe Acrobat™ format (from Adobe Systems, Inc., of San Jose, Calif.).

These additional files may be used by the quality analyst(s) 136 to evaluate differences between the current flow file and the baseline. For example, the output file may be used to evaluate differences (for example, on a character-by-character basis) associated with changes in different versions of the software application. Moreover, the output file may be converted into XML format and used to provide data entries (or inputs) in subsequent software testing.

Note that the goal of the testing technique is to significantly reduce human interaction with the application under test 132, RTP 116 and the test data. However, typically there will be a need for human experts to perform the initial test case design and to inspect the test results to identify new defects. This latter operation may be performed by quality analyst(s) 136, who evaluate identified differences between the current flow file and a baseline (such as a baseline flow file) at terminal(s) 138. Moreover, this evaluation may, at least in part, be graphical (as illustrated in graphical user interface 500 in FIG. 5).

During the evaluation, a given quality analyst may determine if a given identified difference is 'as designed' or not. If the given quality analyst approves the given difference, this change in the current flow file may become a part of the baseline flow file for use in subsequent software testing (such as during cyclical regression). Thus, the test cases 142 (including functional paths through the software application) may be modified based on test data (in flow files 144) and test results (in flow files 144 and/or additional files 146). Moreover, the revised baseline flow file may provide data entries for use by RTP 116 during subsequent software testing.

If the given difference is not approved by the given quality analyst, it will be flagged as an error for subsequent repair. Thus, the test cases 142 in scalable system 100 are added to or shed (as opposed to manually maintained). Note that the comparing of the flow files 144 and the evaluating of identified differences may be performed during the software testing and/or off-line. Moreover, this testing technique may constitute a continuous or ongoing process, in which: test operator 112 performs software testing using RTP 116 on a current version of the software, quality analyst(s) 136 may identify errors, and software developers may generate a new version of the software, which corrects the identified errors, for subsequent software testing.

As noted previously, in some embodiments an initial version of the one or more baseline flow files is generated by visual test case documenter 134 when test operator 112 manually performs one or more (initial) predetermined test cases. Note that the order in which the data is collected during this manual software-testing process may not matter.

In some embodiments, during this manual software-testing process, code profiler 140 parses source code in application under test 132 in order to: identify all GUIs in the application under test 132, identify the interrelationships between the GUIs, and/or identify function calls made by each GUI. For example, for a given GUI, code profiler 140 may identify which GUIs it calls, and which GUIs call it. Moreover, code profiler 140 may identify GUIs to which code changes were made and new GUI relationships from one version of the software application to the next. This capability may act as a reference tool that prevents unintentional effects of a change in one GUI on any 'related' GUIs no matter how many or how distant, which may identify gaps in test cases 144 (such as GUIs that are not touched by a given test case, but which should be). Additionally, code profiler 140 may identify GUIs for which there should have been a change observed in the application under test 132 by test code that interacts with it. Therefore, in some embodiments code profiler 140 is used both during the manual software testing, and during the subsequent testing described previously. For example, code profiler 140 may supplement runtime object recognition 130.

Figure 2:
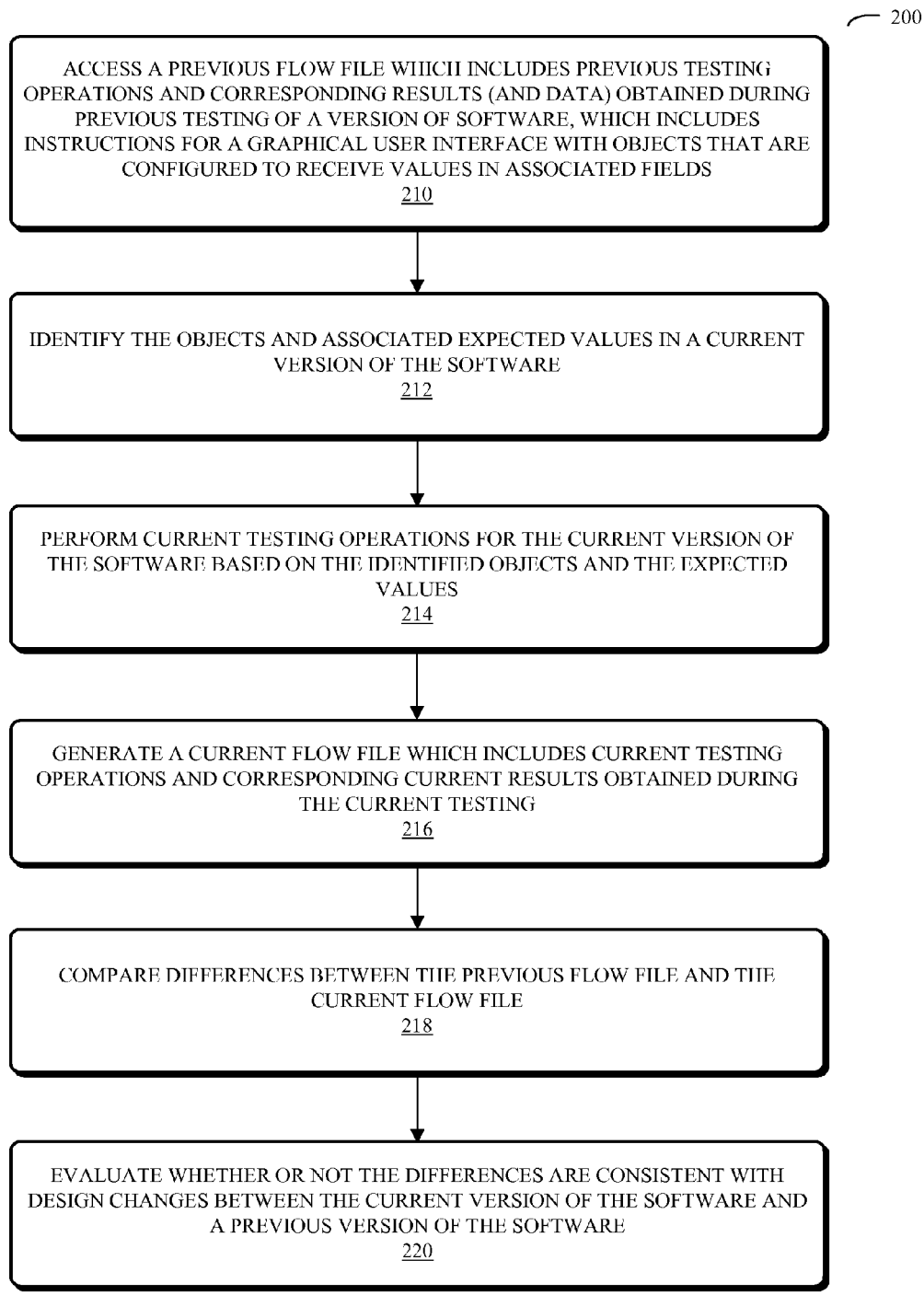
FIG. 2 is a flow chart illustrating a process for testing software in accordance with an embodiment of the present invention.

We now describe embodiments of processes for testing software and documenting the testing of the software. FIG. 2 presents a flow chart illustrating a process 200 for testing software, which may be performed by a system (such as the scalable system 100 in FIG. 1). During operation, the system accesses a previous flow file which includes previous testing operations and corresponding results (as well as data) obtained during previous testing of a version of the software (210), which can include a current version of the software. Note that the current version of the software includes instructions for a graphical user interface with objects that are configured to receive values in associated fields. Then, the system identifies the objects and associated expected values in the current version of the software (212). Next, the system performs current testing operations for the current version of the software based on the identified objects and the expected values (214). Moreover, the system generates a current flow file which includes current testing operations and corresponding current results obtained during the current testing (216) (which are sometimes referred to as 'test evidence').

Additionally, the system compares differences between the previous flow file and the current flow file (218), and evaluates whether or not the differences are consistent with design changes between the current version of the software and a previous version of the software (220). For example, the differences may be presented to quality analyst(s) 136 (FIG. 1). These quality analyst(s) may evaluate whether or not the differences are consistent with design changes to the software application.

In some embodiments, identifying the objects and the expected values may involve analyzing the current version of the software to determine the expected values for their associated fields (or field identifiers), for example, using runtime object recognition 130 (FIG. 1). Additionally, performing the current testing may involve retrieving stored values in the previous flow file and inserting the stored values into the associated fields (or field identifiers). Note that the order of the current testing operations may be different than the order of the previous testing operations.

Figure 3:
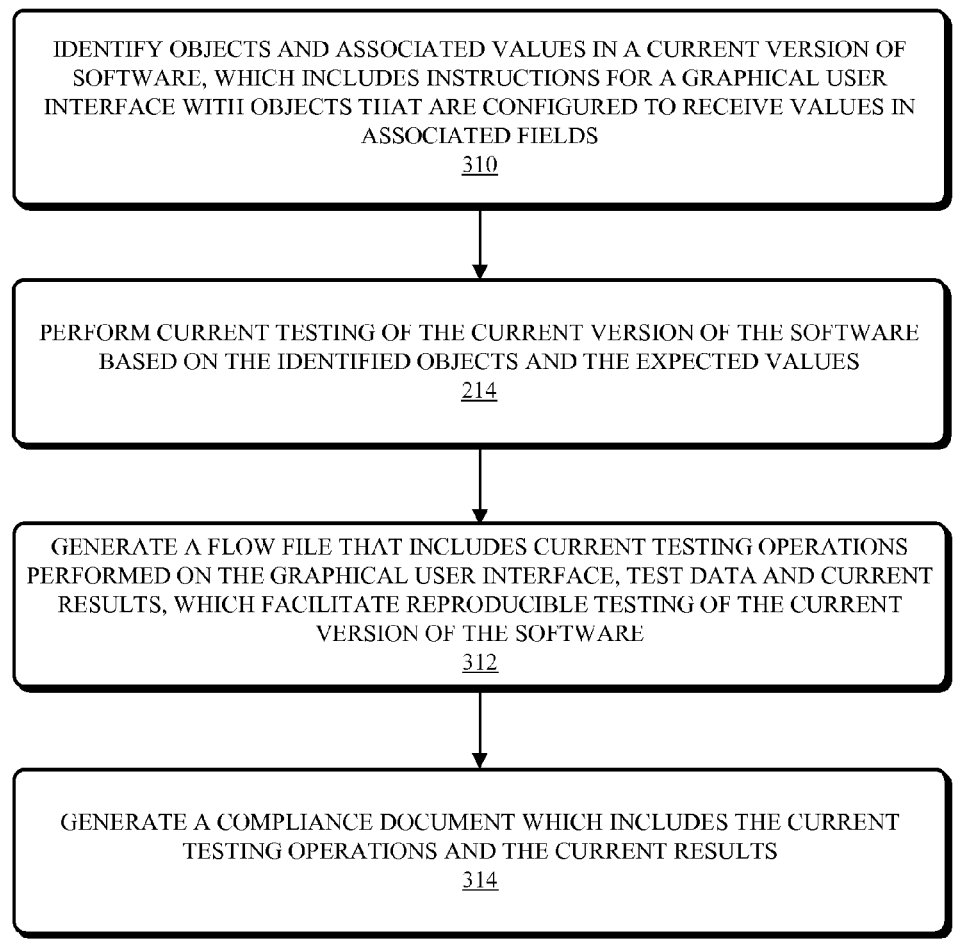
FIG. 3 is a flow chart illustrating a process for documenting testing of a current version of software in accordance with an embodiment of the present invention.

FIG. 3 presents a flow chart illustrating a process 300 for documenting testing of a current version of software, which may be performed by a system (such as the scalable system 100 in FIG. 1). Note that the current version of the software includes instructions for a graphical user interface with objects that are configured to receive values in associated fields. During operation, the system identifies the objects and associated expected values in the current version of the software (310). Then, the system performs current testing operations for the current version of the software based on the identified objects and the expected values (214). Next, the system generates a flow file that includes current testing operations performed on the graphical user interface, test data and current results (312), which facilitates reproducible testing of the current version of the software. Moreover, the system generates a compliance document which includes the current testing operations and the current results (314).

This compliance document may fulfill compliance requirements for regulation associated with the testing of the current version of the software. For example, the regulation may include the Sarbanes-Oxley Act. Moreover, a format of the compliance document may be compatible with word-processing software. Note that the compliance document may facilitate repeating of at least a portion of the current testing operations by a test operator (such as test operator 112 in FIG. 1).

Note that the current flow file may be generated by testing software (for example, using the visual test case documenter 134 in FIG. 1) during the current testing of the current version of the software. Moreover, the current flow file may be generated without input from the test operator 112 (FIG. 1). Additionally, the current flow file may be configured for processing by the testing software.

In some embodiments of processes 200 (FIG. 2) and/or 300 there may be additional or fewer operations. Moreover, the order of the operations may be changed, and/or two or more operations may be combined into a single operation.

Figure 4A:
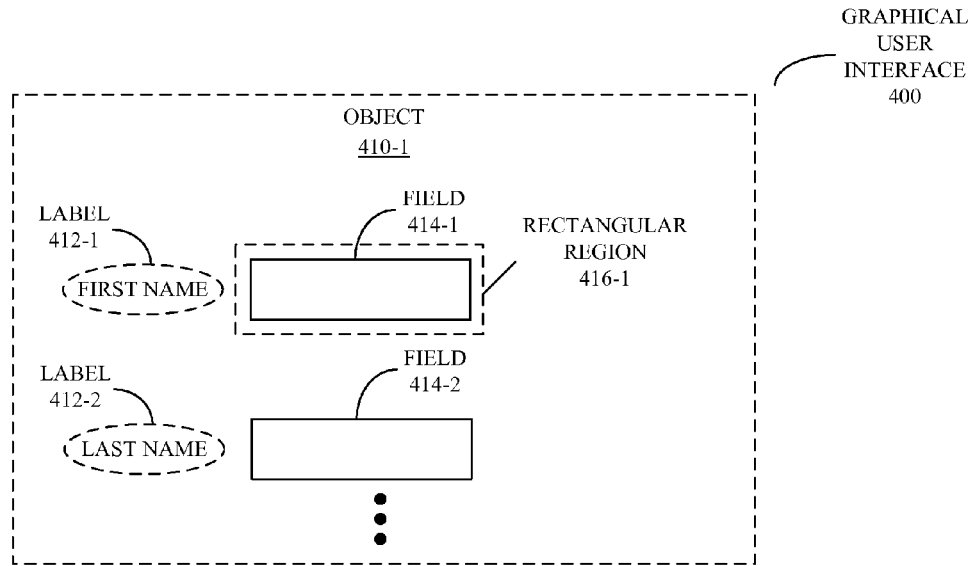
FIG. 4A is a block diagram illustrating a graphical user interface in an application under test in accordance with an embodiment of the present invention.

We now describe runtime recognition of objects in a GUI. FIG. 4A is a block diagram illustrating a GUI 400 in an application under test (such as application under test 132 in FIG. 1). During software testing, runtime object recognition 130 (FIG. 1) can be recursively called to identify objects (such as object 410-1) and fields 414. For example, runtime object recognition 130 can be used to track object 410-1 and/or fields 414 while they are being rendered by a graphics processor. This capability can allow intelligent automation engine 120 (FIG. 1) to recognize where it needs to insert values or read values from a file (such as one of flow files 144 in FIG. 1).

Figure 4B:
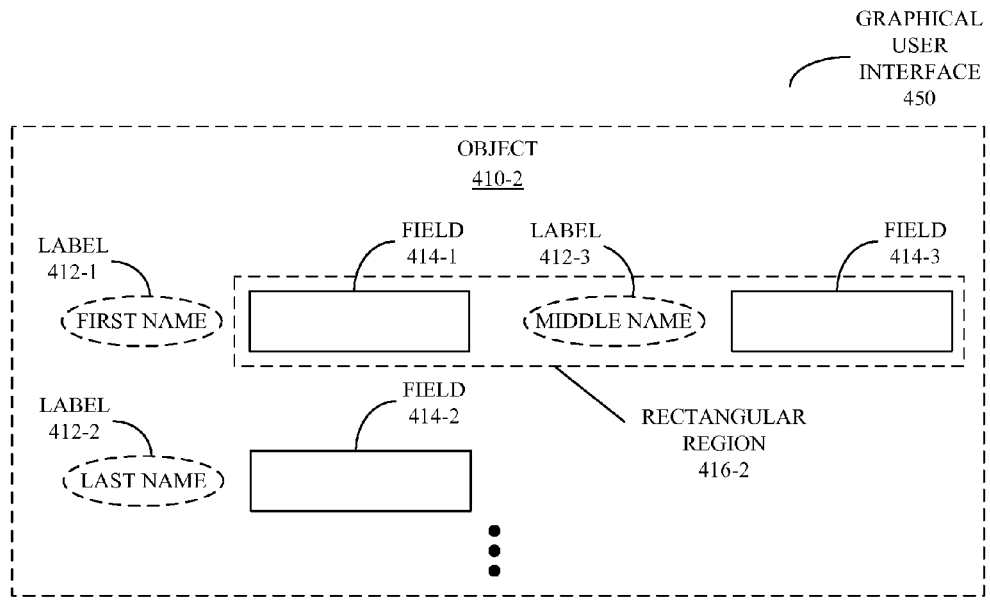
FIG. 4B is a block diagram illustrating a graphical user interface in an application under test in accordance with an embodiment of the present invention.

In an exemplary embodiment, labels 412 are used to identify fields 414. For example, field 414-1 may be identified based on label 412-1 ("First Name"). This allows the data context to be determined more accurately than by only using the static coordinates of fields 414. If label 412-1 is unique in object 410-1, rectangular region 416-1 may be defined relative to label 412-1. This rectangular region can be used to define where a data entry will be entered into object 410-1, and thus, into field 414-1. However, as shown in FIG. 4B, which is a block diagram illustrating a GUI 450 in an application under test, if more than one field intersects with the same horizontal coordinate as label 412-1, then rectangular region 416-2 may encompass fields 414-1 and 414-3. In this example, runtime object recognition 130 will identify field 414-1 as the correct field for data entry associated with label 412-1 based on the proximity of field 414-1 to label 412-1.

Figure 5:
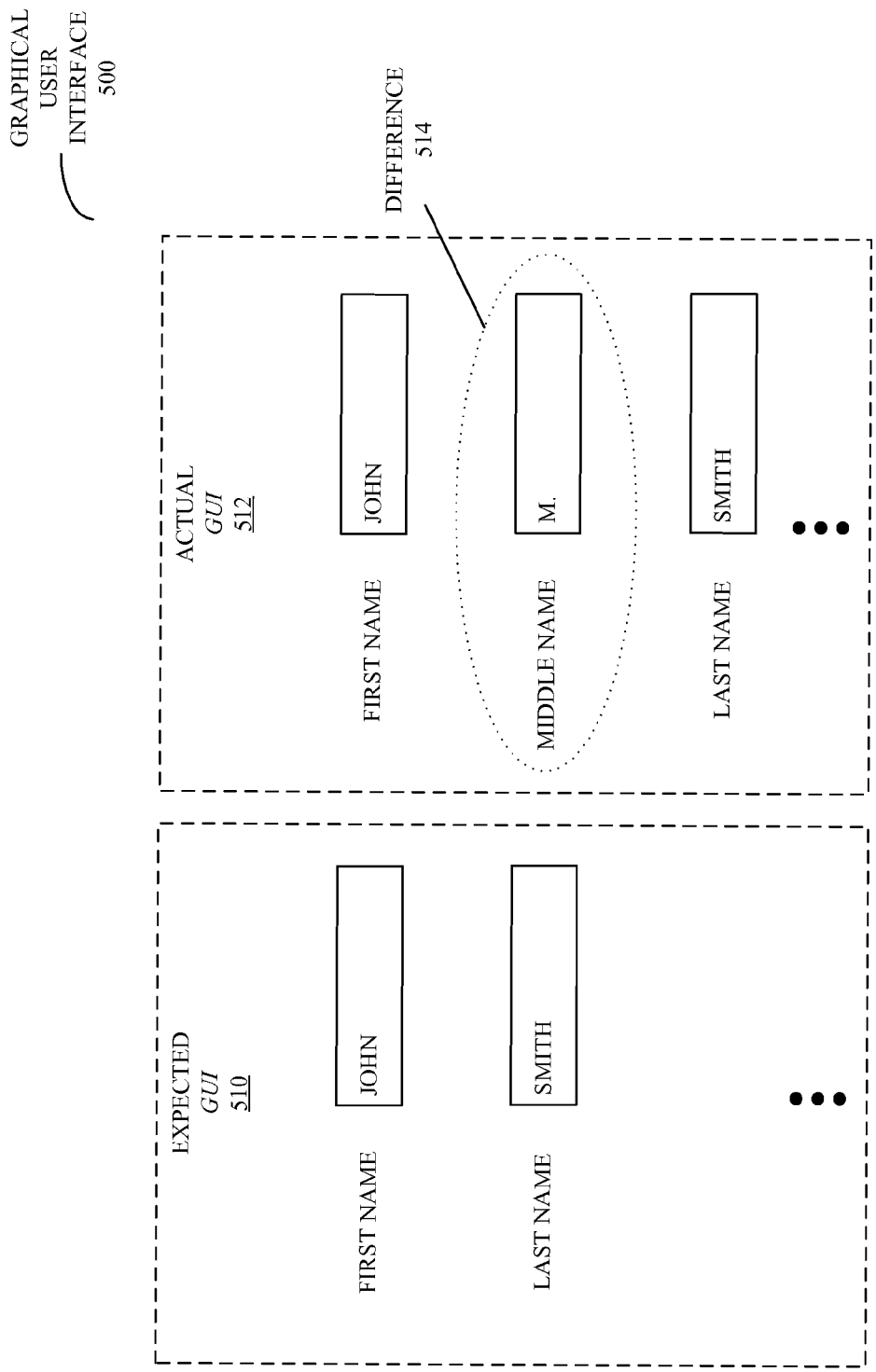
FIG. 5 is a block diagram of a graphical user interface for use in evaluating differences between different iterations of testing of a software application in accordance with an embodiment of the present invention.

We now describe embodiments of a user interface for use during testing of software. FIG. 5 presents a block diagram of a GUI 500 for use in evaluating differences between different iterations of testing of a software application. In particular, this GUI may be presented to quality analyst(s) 136 (FIG. 1) on terminal(s) 138 (FIG. 1) to allow them to assess differences (such as difference 514) between an expected GUI 510 and an actual GUI 512, as determined during software testing (and stored in corresponding flow files). In some embodiments, the expected GUI 510 and the actual GUI 512 are presented next to one another, and differences, such as difference 514, are highlighted. One or more of quality analyst(s) 136 (FIG. 1) may use GUI 500 to indicate whether or not difference 514 is as designed, or if it constitutes an error or a bug in application under test 132 (FIG. 1), which will need to be repaired.

Moreover, using GUI 500, a given quality analyst can sort the tested GUIs in application under test 132 (FIG. 1) so that a subset of these GUIs is presented. For example, the subset of GUIs in application under test 132 (FIG. 1) may include: GUIs that are changed (relative to the baseline, which was determined for a previous version of the software); GUIs that are missing in the current version of the software (relative to the baseline); GUIs that are new in the current version of the software (relative to the baseline); GUIs that are out of sequence in the current version of the software (relative to the baseline); and/or GUIs that are unchanged and okay in the current version of the software (relative to the baseline). Note that GUI 500 can be used as part of a test console that is used to oversee the software testing, and which can allow GUIs in the application under test 132 (FIG. 1) to be tested to the smallest detail.

Figure 6:
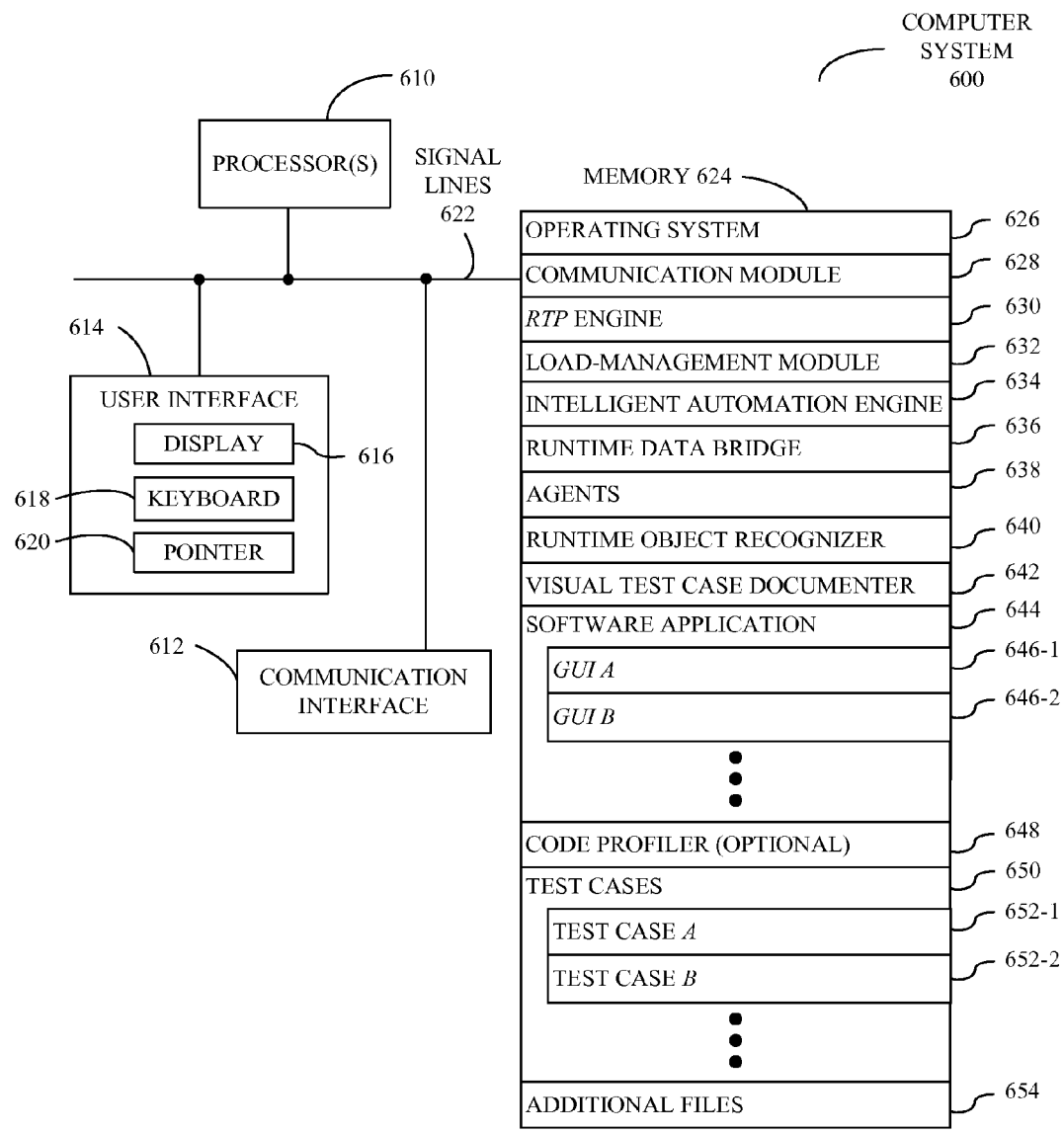
FIG. 6 is a block diagram illustrating a computer system that tests software in accordance with an embodiment of the present invention.

We now describe embodiments of a computer system that performs processes 200 and/or 300. FIG. 6 presents a block diagram illustrating a computer system 600 that tests software. Computer system 600 includes one or more processors 610, a communication interface 612, a user interface 614, and one or more signal lines 622 coupling these components together. Note that the one or more processing units 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in the computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. While not explicitly indicated in the computer system 600, in some embodiments the operating system 626 includes a web browser. Memory 624 may also store procedures (or a set of instructions) in a communication module 628. These communication procedures may be used for communicating with one or more computers and/or servers, including computers and/or servers that are remotely located with respect to the computer system 600.

Memory 624 may also include multiple program modules (or sets of instructions), including: RTP engine 630 (or a set of instructions), load-management module 632 (or a set of instructions), intelligent automation engine 634 (or a set of instructions), runtime data bridge 636 (or a set of instructions), agents 638 (or a set of instructions), runtime object recognizer 640 (or a set of instructions), visual test case documenter 642 (or a set of instructions), software application 644 (or a set of instructions), and/or optional code profiler 648 (or a set of instructions). Software application 644 may include instructions for GUIs, such as GUI A 646-1 or GUI B 646-2, which each may include multiple objects.

Software testing of software application 644 may be performed using one or more of the program modules, as described previously in the discussion of scalable system 100 (FIG. 1). This software testing may be based on test cases 650, such as test case A 652-1 or test case B 652-2. Moreover, during the software testing one or more of test cases 650 and/or one or more additional files 654 may be created or updated using visual test case documenter 642.

In some embodiments, software application 644 includes financial software. This financial software may include software such as: Quicken™ (from Intuit, Inc., of Mountain View, Calif.), TurboTax™ (from Intuit, Inc., of Mountain View, Calif.) and/or other planning software capable of processing financial information. Moreover, the financial software may include software such as QuickBooks™ (from Intuit, Inc., of Mountain View, Calif.) and/or other payroll or accounting software capable of processing payroll information.

Computer system 600 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, communication interface 612 may communicate information with other devices over a variety of networks, including: the Internet, World Wide Web (, an intranet, LAN, WAN, MAN, or a combination of networks, or other technology enabling communication between computing systems.

Instructions in the various modules in the memory 624 may be implemented in: a high-level procedural language, an object-oriented programming language, and/or in an assembly or machine language. Note that the programming language may be compiled or interpreted, e.g., configurable or configured, to be executed by the one or more processing units 610.

Although the computer system 600 is illustrated as having a number of discrete items, FIG. 6 is intended to be a functional description of the various features that may be present in the computer system 600 rather than a structural schematic of the embodiments described herein. In practice, and as recognized by those of ordinary skill in the art, the functions of the computer system 600 may be distributed over a large number of servers or computers, with various groups of the servers or computers performing particular subsets of the functions. In some embodiments, some or all of the functionality of the computer system 600 may be implemented in one or more application-specific integrated circuits (ASICs) and/or one or more digital signal processors (DSPs).

Scalable system 100 (FIG. 1) and/or computer system 600 may include fewer components or additional components. Moreover, two or more components may be combined into a single component, and/or a position of one or more components may be changed. In some embodiments, the functionality of scalable system 100 (FIG. 1) and/or computer system 600 may be implemented more in hardware and less in software, or less in hardware and more in software, as is known in the art.

Figure 7:
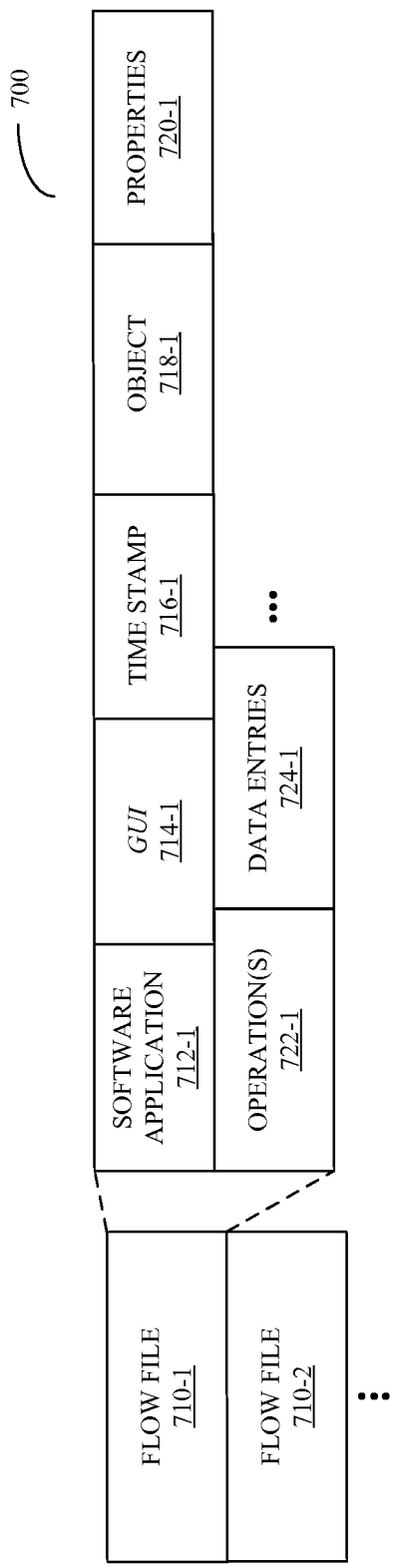
FIG. 7 is a block diagram illustrating a data structure in accordance with an embodiment of the present invention.

We now discuss data structures that may be used in scalable system 100 (FIG. 1) and/or computer system 600. FIG. 7 presents a block diagram illustrating a data structure 700. This data structure may include flow files 710 for one or more test cases. For example, flow file 710-1 may include: software application 712-1, GUI 714-1, time stamp 716-1, object 718-1, properties 720-1 (such as a form set and/or field identifier), operation(s) 722-1, and/or data entries 724-1.

Figure 8:
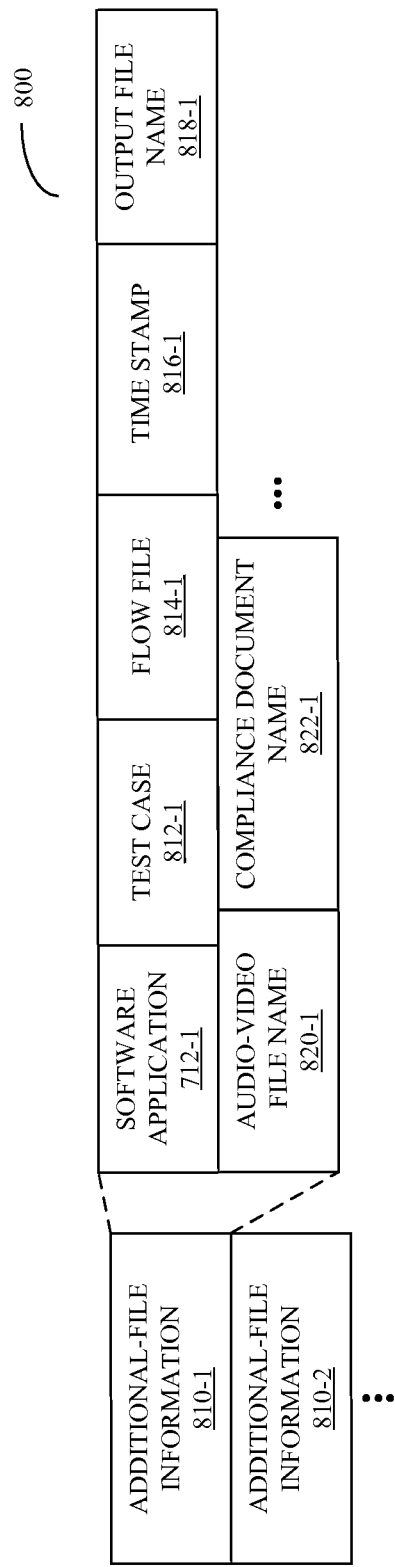
FIG. 8 is a block diagram illustrating a data structure in accordance with an embodiment of the present invention.

FIG. 8 presents a block diagram illustrating a data structure 800. This data structure may include information associated with additional files for one or more test cases. For example, additional-file information 810-1 may include: software application 712-1, test case 812-1, flow file 814-1, time stamp 816-1, output file name 818-1, audio-video file name 820-1, and/or compliance document name 822-1.

Note that in some embodiments of data structures 700 (FIG. 7) and/or 800 there may be fewer or additional components. Moreover, two or more components may be combined into a single component, and/or a position of one or more components may be changed.

While the preceding embodiments have illustrated the use of the visual test case documenter in conjunction with the RTP, in other embodiments the visual test case documenter is used independently, for example, as a stand-alone application.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for testing software, comprising:
accessing a previous flow file which includes previous testing operations and corresponding results obtained during previous testing of a previous version of the software, wherein both the previous version of the software and a current version of the software include instructions for a graphical user interface with objects that are configured to receive values in associated fields;
identifying the objects in the current version of the software;
performing current testing of the current version of the software by:
identifying a current object,
retrieving an associated testing operation from the previous flow file,
automatically testing the current object with the associated testing operation to create a corresponding current result, and
wherein the current objects are tested in arbitrary order as they are encountered, without the presence of a static testing script;
generating a current flow file which includes the current testing operations and the corresponding current results obtained during the current testing;
comparing differences between the previous flow file and the current flow file; and
evaluating whether or not the differences are consistent with design changes between the current version of the software and a previous version of the software.

2. The method of claim 1, further comprising defining the current flow file as the previous flow file to facilitate additional testing of the current version of the software or a subsequent version of the software.

3. The method of claim 1, wherein the comparison of the differences between the previous flow file and the current flow file involves graphically presenting the differences.

4. The method of claim 1, wherein the evaluating involves receiving an evaluation from a test operator.

5. The method of claim 1, wherein identifying the objects and the expected values involves using testing software to analyze the current version of the software to determine the expected values for their associated fields.

6. The method of claim 1, wherein performing the current testing involves retrieving stored values in the previous flow file and inserting the stored values into the associated fields.

7. The method of claim 1, wherein an order of the current testing operations is different than an order of the previous testing operations.

8. The method of claim 1, further comprising receiving the current version of the software.

9. The method of claim 1, further comprising performing the previous testing of the current version of the software; and storing the previous flow file.

10. The method of claim 9, wherein the previous testing is performed by a test operator based on a predetermined test case.

11. The method of claim 1, wherein the comparing and the evaluating are performed during the current testing.

12. The method of claim 1, wherein the current flow file is generated without input from a test operator.

13. The method of claim 1, wherein performing current testing of the current version of the software involves assigning test cases to test agents executing on computers, wherein a test agent executing on a given computer performs a given test case.

14. The method of claim 13, wherein the test agents operate independently of each other.

15. The method of claim 13, wherein at least some of the test cases are performed in parallel on the computers.

16. The method of claim 13, wherein the method facilitates testing of the current version of the software which is limited by a number of available computers instead of a number of test operators performing the testing.

17. A computer-program product for use in conjunction with a computer system, the computer-program product comprising a non-transitory computer-readable storage medium and a computer-program mechanism embedded therein for testing software, the computer-program mechanism including:
instructions for accessing a previous flow file which includes previous testing operations and corresponding results obtained during previous testing of a previous version of the software, wherein both the previous version of the software and a current version of the software includes instructions for a graphical user interface with objects that are configured to receive values in associated fields;
instructions for identifying the in the current version of the software;
instructions for performing current testing of the current version of the software by:
identifying a current object,
retrieving an associated testing operation from the previous flow file,
automatically testing the current object with the associated testing operation to create a corresponding current result, and
wherein the current objects are tested in arbitrary order as they are encountered, without the presence of a static testing script;
instructions for generating a current flow file which includes the current testing operations and the corresponding current results obtained during the current testing;
instructions for comparing differences between the previous flow file and the current flow file; and
instructions for evaluating whether or not the differences are consistent with design changes between the current version of the software and a previous version of the software.

18. The computer-program product of claim 17, wherein identifying the objects and the expected values involves using testing software to analyze the current version of the software to determine the expected values for their associated fields.

19. The computer-program product of claim 17, wherein an order of the current testing operations is different than an order of the previous testing operations.

20. The computer-program product of claim 17, wherein the comparing and the evaluating are performed during the current testing.

21. A computer system, comprising:
a processor;
memory;
a program module, wherein the program module is stored in the memory and configured to be executed by the processor, the program module including:
instructions for accessing a previous flow file which includes previous testing operations and corresponding results obtained during previous testing of a previous version of the software, wherein both the previous version of the software and a current version of the software includes instructions for a graphical user interface with objects that are configured to receive values in associated fields;

instructions for identifying the objects in the current version of the software;

instructions for performing current testing of the current version of the software by:
- identifying a current object,
- retrieving an associated testing operation from the previous flow file,
- automatically testing the current object with the associated testing operation to create a corresponding current result, and
- wherein the current objects are tested in arbitrary order as they are encountered, without the presence of a static testing script;

instructions for generating a current flow file which includes the current testing operations and the corresponding current results obtained during the current testing;

instructions for comparing differences between the previous flow file and the current flow file; and instructions for evaluating whether or not the differences are consistent with design changes between the current version of the software and a previous version of the software.

* * * * *